United States Patent [19]

D'Antonio

[11] 4,158,193
[45] Jun. 12, 1979

[54] DATA TRANSMISSION TEST SET WITH SYNCHRONIZATION DETECTOR

[75] Inventor: Renato A. D'Antonio, North Attleboro, Mass.

[73] Assignee: International Data Sciences, Inc., Lincoln, R.I.

[21] Appl. No.: 803,987

[22] Filed: Jun. 6, 1977

[51] Int. Cl.² .................... G08C 25/00; H04L 17/00
[52] U.S. Cl. .............................. 340/146.1 D; 178/69.1
[58] Field of Search ................. 340/146.1 D, 146.1 C, 340/146.1 E; 178/69.1

[56] References Cited

U.S. PATENT DOCUMENTS

| | | | |
|---|---|---|---|
| 3,305,636 | 2/1967 | Webb | 340/146.1 D |
| 3,466,601 | 9/1969 | Tong | 340/146.1 D |
| 3,550,082 | 12/1970 | Tong | 340/146.1 D |
| 3,562,710 | 2/1971 | Halleck | 340/146.1 D |
| 3,571,794 | 3/1971 | Tong | 340/146.1 D |
| 3,596,245 | 7/1971 | Finnie et al. | 340/146.1 D |
| 3,648,237 | 3/1972 | Frey, Jr. | 340/146.1 D |
| 3,733,585 | 5/1973 | Merlo | 340/146.1 D |

OTHER PUBLICATIONS

Green and San Soucie, An Erro-Correcting Encoder and Decoder of High Efficiency, Proceeding of IRE, Oct. 1958, pp. 1741–1744.

*Primary Examiner*—Charles E. Atkinson
*Attorney, Agent, or Firm*—Salter & Michaelson

[57] ABSTRACT

Data transmission test set used for making error counts and incorporating a new and improved synchronization detector to rapidly detect loss of synchronization between the received data pattern which is supposed to be a psuedo random pattern and the locally generated error free replica psuedo random test pattern. In this system, the received data pattern and a first locally generated psuedo random pattern are used to generate an error pattern which is then used to effect generation of a second local psuedo random comparator pattern. The second pattern and the error pattern are then used to generate a third pattern, the bits of which are used to determine if loss of synchronization has or has not occurred. Loss of synchronization is determined almost immediately thus preventing the running error count from being severely affected by loss of synchronization. The detected occurrence of loss of synchronization is used to resync the test set and is also displayed to the test set user.

4 Claims, 3 Drawing Figures

4,158,193

DATA TRANSMISSION TEST SET WITH SYNCHRONIZATION DETECTOR

BACKGROUND OF THE DISCLOSURE

This invention is directed to a test set having a new and improved loss of synchronization (sync) detector for testing high speed synchronous data communication channels. In this test set as in the prior art test sets, repeating psuedo random bit patterns are transmitted by a transmitter section and compared with a true replica of the locally generated psuedo random bit pattern.

In this test set however, a novel loss of synchronization detector is provided which allows loss of synchronization to be detected with such rapidity that normal error counting is substantially unaffected. In the prior art test sets, loss of synchronization was determined by monitoring the number of errors in a preset number of received bits and if the number of errors was greater than a predetermined number then it was assumed loss of synchronization occurred.

In the prior art, it was conventional to base a loss of synchronization determination on the detection of about three to six thousand errors. With the present invention it is no longer necessary to count three to six thousand errors to make a determination that loss of synchronization has occurred. With the present invention it is now possible with a high degree of confidence to determine loss of synchronization in as few as 22 bits of received data and even a fewer number of bits e.g., 8 or less if desired, depending upon the number of bits in the psuedo random pattern.

In the preferred embodiment of this invention loss of synchronization is determined if any sixteen errors occur in a row or consecutively, i.e. identical to any sixteen bits of the pseudo random pattern (see FIG. 3), however it should be understood that more than sixteen consecutive errors e.g., 100 errors or less than sixteen consecutive errors may be used for this loss of sync determination depending upon the statistical confidence level that one is willing to accept.

As used herein a bit represents a "1" or "0" digital level e.g., +5v and 0v respectively, as conventionally used in digital systems. This invention provides a further advantage over the prior art in that it is no longer necessary to discard the running error count since loss of synchronization is detected so rapidly.

As used in this disclosure loss of synchronization in a synchronous data transmission system is defined as a slippage of a clock signal, the presence of erronous clock signals, loss of received data or a different frequency in the received data with respect to the clock, all of which leads to a substantial error rate.

Prior art data test sets using the aforementioned prior art loss of synchronization scheme are sold by International Data Systems, Inc. of Providence, R.I. as the Range Rider ® Models 1000, 1100 or 1200 data test sets.

BRIEF DESCRIPTION OF THE DISCLOSURE

Figure 1:
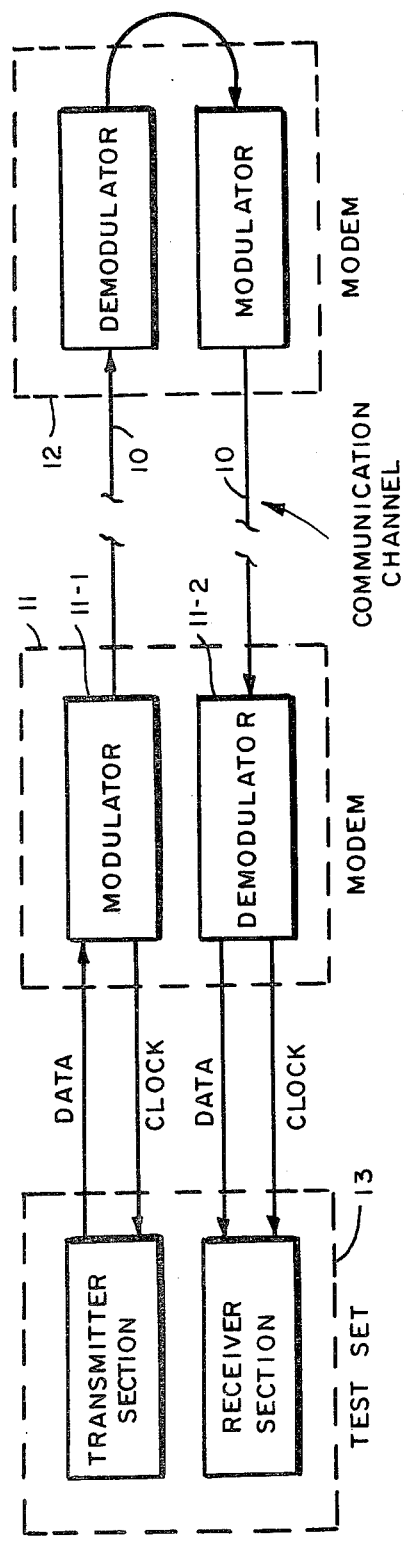
FIG. 1 is a block diagram illustrating a data communication system coupled to the test set in a typical application.

Data Transmission test sets are conventionally used for testing high speed synchronous data communication channels to determine bit error rates. To do so, repeating psuedo random bit (ps) patterns are locally generated and transmitted by the test set transmitter section.

After the transmitted bit pattern has travelled around the communication loop, it is fed into the test set receiver section and compared with a true replica of the locally generated psuedo random pattern.

The present invention provides a means for quickly detecting loss of synchronization between the true replica and the received test pattern i.e., the previously transmitted pattern in a manner so as not to substantially effect and invalidate the running error count.

A psuedo random (ps) pattern is an industry standard test pattern and represents a particular bit stream of $2^n - 1$ bits where n is equal to the number of stages in a shift register which is caused to generate the pattern, it being understood that all "0"'s is an illegal state. Thus a psuedo random pattern generated with the six flip-flops shown in FIG. 3 (Q output of preceding F/F connected to data input of succeeding F/F) provides a psuedo random pattern of $2^6 - 1$ bits or 63 bits.

It has been found in this invention that if an out of sync (synchronism) received pattern is exclusively "OR"ed with the true replica pattern (the local generated or fixed psuedo random pattern), an error pattern is generated which is identical to the locally generated or fixed psuedo random (ps) pattern but out of time displacement (synchronization) therewith.

This may readily be observed by assuming a ps pattern of eight minus one bits from a locally generated psuedo random (ps) pattern generator is e.g., 0010111 and the received error free pattern is out of synchronization by one clock bit e.g., 0101110. The exclusive "OR"ing of two consecutive patterns such signals produce the following:

001011100101110-local fixed ps pattern
010111001011100-received pattern
011100101110010-error pattern It may be observed that each of the above three patterns are identical, but displaced in time from one another.

The error pattern is then exclusively "OR"ed with a second locally generated psuedo random pattern which itself is generated in response to the error pattern signal to provide a pattern of bits indicating if there is an out of synchronization condition (on a bit by bit basis).

The reason for making the second comparison is to determine if in fact the error pattern is a psuedo random pattern since if the same psuedo random pattern is exclusively "OR"ed with the same psuedo random pattern the result will be all "0"'s. If this is true then there is confirmation that there is a true loss of synchronization condition. In the preferred embodiment the first error bit, a "1", of the error pattern is loaded into a shift register and the shift register is then clocked to generate the same 63 bit psuedo random pattern as the original psuedo random pattern. If the second psuedo random pattern is the same as the error pattern an exclusive "OR" comparison will produce the same level output for each error.

The occurrence of a consecutive sequence of the same level bits indicating an out of sync condition (e.g., sixteen (16) "0"'s in a row as in the preferred embodiment will produce an output signal indicating an out of synchronization condition. This out of sync signal is then fed back to the conventional first local psuedo random (ps) pattern generator i.e., the ps generator not a part of the sync detector to cause it to reset (sync) itself as in the prior art to correct for the out of sync condition).

In the prior art, resetting of the generator would take place after determining that a preset number of error counts has occurred e.g., 3000 to 6000.

Thus in this test set resync takes place quite rapidly after determining an out of sync condition has occurred and the running error count need not be voided. A display e.g., light is also preferably provided so that the test set operator can determine if an out of sync condition is occurring at too frequent intervals which indicates more serious trouble in the communications system.

DETAILED DESCRIPTION OF THE DISCLOSURE

Figure 2:
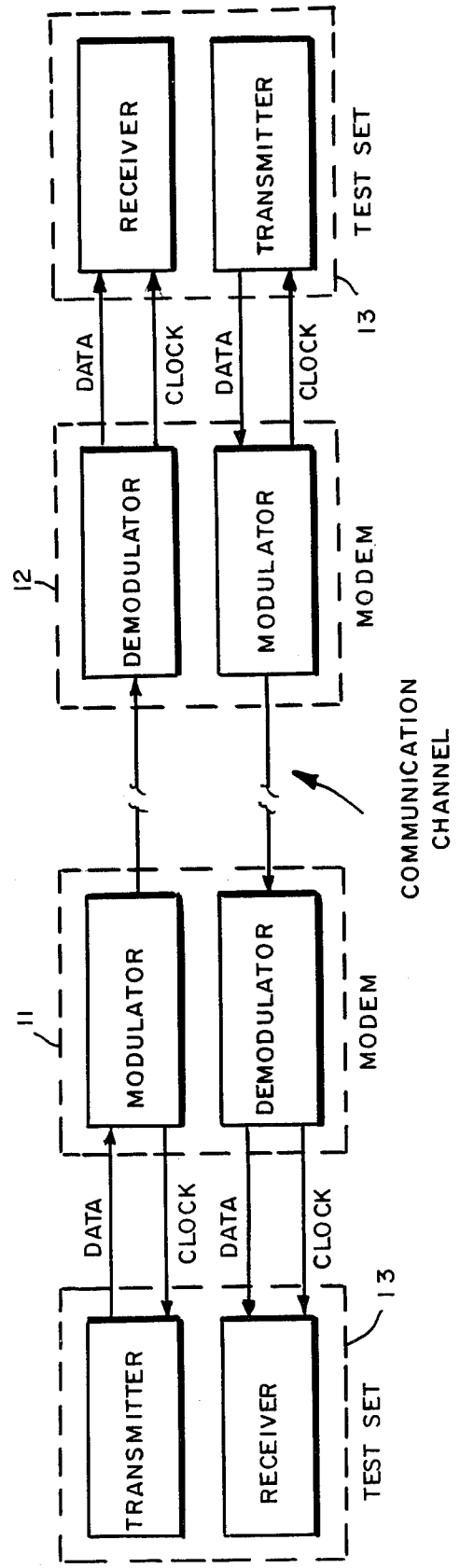
FIG. 2 is a block diagram, illustrating a data communication system coupled to two data test sets in a typical application.

Reference should now be had to FIGS. 1 and 2 which show the use of a data test set of this invention to determine the error rate of a digital data communication system. The typical data system comprises a communication channel 10 e.g., telephone lines coupled between first and second MODEMS 11 and 12, each comprising a modulator and demodular.

Identification of conventionally available MODEMS are described in U.S. Pat. No. 3,893,072 issued July 1, 1975, the disclosure of which is incorporated herein by reference thereto.

In FIG. 1 MODEM 12 is shown looped around so that only one test set 13 is used.

FIG. 2 shows two identical test sets 13 being used to determine the error rates for a communication system.

Figure 3:
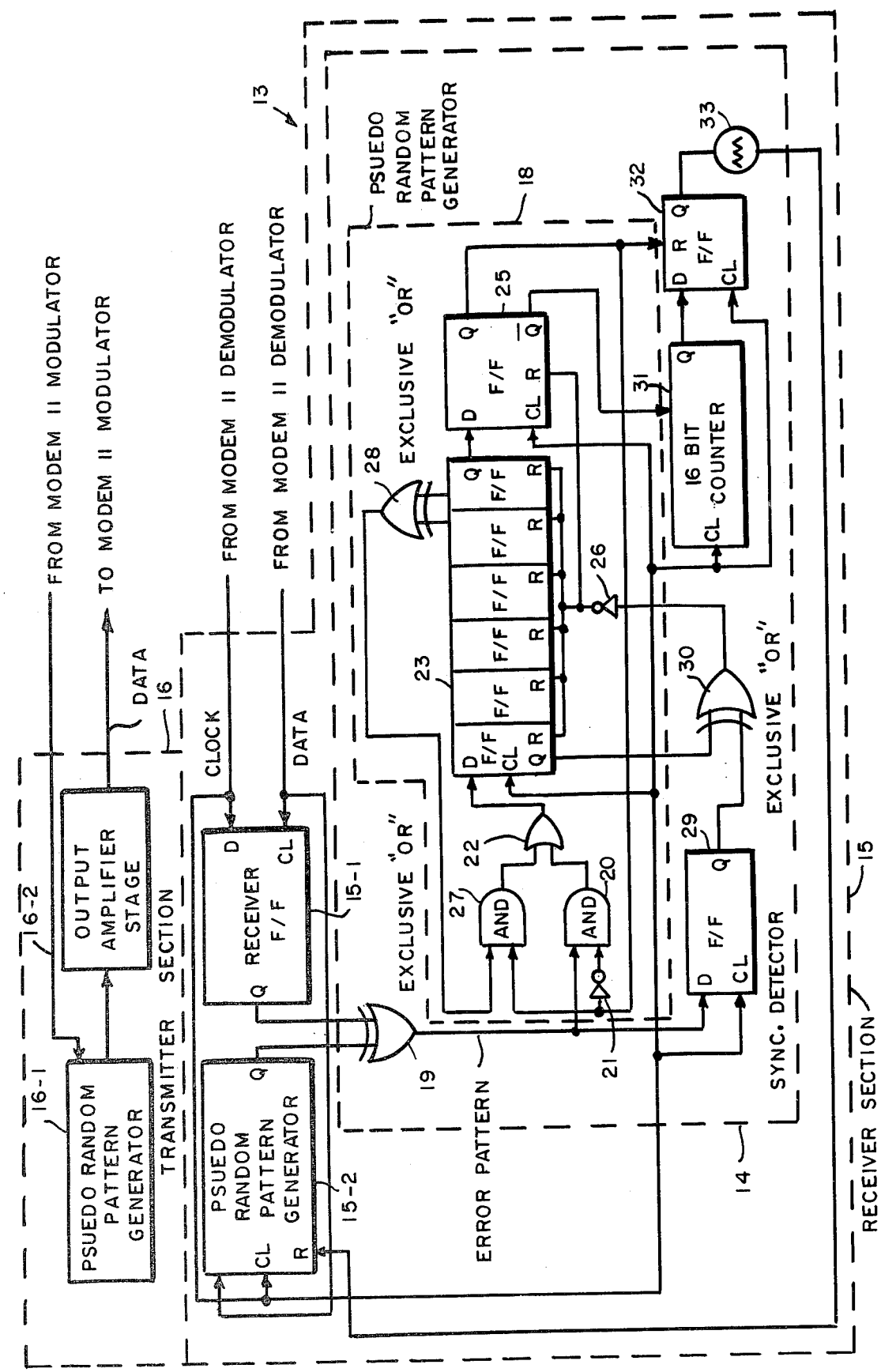
FIG. 3 is a block diagram of the test set which includes the new synchronization detector of this invention.

In FIG. 3 there is shown a test set 13 having the new sync detector 14 according to this disclosure coupled to a conventional receiver 15-1 and psuedo random pattern generator 15-2 used in a receiver section 15 such as in the aforementioned Range Rider ® Models 1000, 1100 or 1200 test sets.

The data test set also has a conventional transmitter section 16 comprising a psuedo random pattern generator 16-1 and an output amplifier stage 16-2. Since the receiver 15-1 psuedo random generators 15-2 and 16-1 and the amplifier stage 16-2 are conventional in presently available data test systems of the prior art and do not constitute the invention, no further explanation of these devices will be given.

The synchronization detector 14 of this invention comprises an exclusive OR gate 19 which has one input coupled to the D type receiver F/F 15-1 for receiving the received data pattern and a second input coupled to the first local psuedo random generator 15-2.

The error pattern obtained from the exclusive OR gate 19 is provided to one input of an AND gate 20. The other input to the AND gate 20 is obtained from a data flip-flop 25 (Q output) which is initially in a "0" state. Thus this second input to AND gate 20 is at a "1" because of invertor 21.

When the first input goes to a "1" (i.e., when a difference between incoming bits is detected) while the second input to AND gate 20 is a "1", the output thereof is a "1" which is fed into OR gate 22. The output from OR gate 22 is now likewise a "1". The "1" output of the OR gate 22 is coupled to the D input of the first stage of six stage shift register 23.

The shift register 23 preferably comprises six edge triggered D type flip-flop such as an SN-74-164. The first "1" bit of the error pattern is clocked by MODEM 11 clock pulses until a "1" bit is provided at the Q output of the last stage of the shift register 23. This "1" bit is applied to the D input of a D type flip-flop 25 which causes the Q output thereof to be set to a "1".

The setting of F/F 25 Q output to a "1" disables gate 20 and enables AND gate 27 to supply the output of exclusive OR gate 28 to the D input of the first F/F stage of the shift register 23. Since the exclusive OR gate 28 is coupled to the Q output of each of the last two F/F stages of the shift register and is fed back as shown, a second locally generated psuedo random pattern (identical bit displaced in time from the psuedo random pattern from generator 15-2) will now be generated and is available from the Q output of the first F/F stage of shift register 23.

Thus both the locally generated psuedo random (ps) patterns are identical and in the preferred embodiment each pattern would contain 63 bits (i.e., $2^n - 1$ where n = No. of flip-flops needed to be connected in the manner as shown to form a shift register). If a longer ps pattern such as 2047 bit (ps) pattern is desired, or a shorter ps is desired, then the number of flip-flops needed to be connected in the manner as shown to form a shift register can be obtained, e.g., by solving the equation $2047 = 2^n - 1$. The generator 15-2 is identical in construction to the psuedo random pattern generator 18 comprising gates 20, 22, 27 F/F 25 and shift register 23 as shown in FIG. 3 except that the received data is fed to the AND gate 20 input and the reset terminal of each of the six F/F's of the generator 15-2 is coupled to be reset by a signal provided by the sync detector.

Thus for 2047 bit ps pattern, one would use 11 F/F's coupled as shown in FIG. 3 and for 65535 bit pattern one would use 15 F/F's. The error pattern from exclusive OR gate 19 is delayed one bit by a D type F/F 29 as shown and the psuedo random pattern from shift register 23 (Q output first F/F) are coupled to an exclusive OR gate 30. The F/F 29 serves to synchronize the error pattern with the shift register 23 first stage Q output.

If the error pattern and second ps pattern are bit by bit identical, the output bits from the exclusive OR gate 30 will be identical (in the preferred embodiment it will be "0"'s) thereby indicating a loss of sync condition has been detected. If the output of exclusive OR gate 30 goes to a "1", this indicates that the error pattern and the ps pattern from shift register 23 are dissimilar, and in fact no out of sync condition exists between the received data and the first locally generated ps pattern from 15-2.

If in the preferred embodiment, a "1" appears before sixteen consecutive "0" bits from gate 30, the shift register 23 and the F/F 25 are reset through invertor 26, and the sync detection process starts over again.

If the bit by bit comparison from gate 30 continues to be all "0"'s for sixteen consecutive bits, a sixteen bit counter, counting MODEM 11 clock pulses, will provide an output signal indicating an out of sync condition which is then used to set a D type flip-flop 32. The D type flip-flop 32 Q output pulses a display, for example, a light 33 and also causes the pattern generator 15-2 to be reset (resynced) so that it once again attempts to resync with the incoming data.

The sixteen bit counter is reset when $\overline{Q}$ of F/F 25 goes to a "1". The F/F 32 is reset when Q of F/F 25 goes to a "0" and indicates a no loss of sync condition. Thus with the preferred embodiment shown, loss of sync is determined after 22 bits starting with the first error and sixteen bits after the second ps pattern has begun to be generated, although it should be understood that an eight bit counter may be used and loss of sync would be determined after fourteen bits starting with the first error bit with a 63 bit pattern.

In general for a ps pattern of $2^n - 1$ bits, the number of bits to be counted by counter 31 prior to setting F/F 32 should be no less than n. Thus it is possible to detect a loss of sync after 2n bits starting with the first error bit detected.

I claim:

1. A synchronization detector for a data transmission test set comprising first means for exclusively "OR"ing a received data pattern and a first locally generated psuedo random pattern to provide an error pattern, second means for generating a second local psuedo random pattern identical in content to said first locally generated psuedo random pattern in response to said error pattern and clock pulses, third means for exclusively "OR"ing said error pattern and said second psuedo random pattern to provide control signals, and fourth means responsive to said control signals for generating an out of sync signal indicating that an out of synchronization condition exists between said received data and said first local psuedo random pattern, said fourth means comprising a counter for continuously receiving and counting clock pulses, a first flip-flop responsive to the output of said counter for providing an out of sync signal, and a second flip-flop forming a portion of said second means for controlling the resetting of said counter and said second flip-flop, said control signals also causing the resetting of said second means and the F/F thereof.

2. A data test set comprising means for exclusively "OR"ing a first locally generated psuedo random signal pattern and a received psuedo random signal pattern to generate an error signal, means triggered by a difference in said signals for providing a second locally generated psuedo random signal pattern, said means comprising a plurality of flip-flops connected together to form a shift register, a first flip-flop triggered to change state upon the last F/F of said shift register changing state, a second flip-flop coupled to and reset by said first F/F upon said first flip-flop changing state, a counter continuously coupled to clock means to continuously count and receive clock signals, said second flip-flop being set when said counter reaches a predetermined count, and means for exclusively "OR"ing said error signal and said second psuedo random signal pattern to reset said counter and first flip-flop if there is a difference between said error signal and said second psuedo random signal pattern.

3. A data test set comprising a receiver for providing a received psuedo random data pattern signal, a first local psuedo random data pattern signal generator, an exclusive "OR" gate having one input coupled to the receiver and the other to the local psuedo random data pattern generator in order to generate a first signal indicating if there is a difference in incoming bits of said patterns, second generator means comprising a multi-stage shift register responsive to said first difference in incoming bits for generating a second local psuedo random data pattern, said second generator means including a first flip-flop responsive to the change in state of the last stage of the shift register and being set thereby, a counter for continuously receiving and counting clock pulses, a second flip-flop coupled to said counter and being set upon the counter reaching a predetermined count, comparison means for exclusively "OR"ing said first signal and said second local psuedo random pattern to determine if said first signal and said second pattern are identical or dissimilar at a particular time, said comparison means being coupled to reset said shift register and said first flip-flop if said first signal and said second pattern are dissimilar at a particular time, said first flip-flop coupled to said counter and to said second flip-flop for resetting the counter upon it being reset and for resetting the second flip-flop upon it being set.

4. The test set according to claim 3 in which said comparison means comprises a third flip-flop to synchronize the first signal with the output of the first stage of the shift register providing said second pattern.

* * * * *